Dec. 23, 1969     J. F. MYERS     3,485,082
METHOD FOR TESTING RELIEF VALVES
Filed Nov. 26, 1968

James F. Myers
INVENTOR.
BY
ATTORNEYS

United States Patent Office 3,485,082
Patented Dec. 23, 1969

3,485,082
METHOD FOR TESTING RELIEF VALVES
James F. Myers, Mission, Kans., assignor to Black, Sivalls and Bryson, Inc., Kansas City, Mo., a corporation of Delaware
Filed Nov. 26, 1968, Ser. No. 779,087
Int. Cl. G01l 27/00
U.S. Cl. 73—4                               3 Claims

ABSTRACT OF THE DISCLOSURE

The present invention teaches the application of pressure on the relief valve side of a rupture disc in a safety head in order to check the operating pressure of the relief valve. This invention has application to rupture discs which rupture in the normal manner in response to pressure applied from the pressure system side, but which can withstand higher pressures exerted from the relief valve side.

BACKGROUND OF THE INVENTION

A major problem in industries where valves are used to release over-pressure is in knowing whether the valve is operative or inoperative and, if operative, whether it will release within an acceptable range of pressures. The opening characteristics of these types of valves are established either by the manufacturer when the valve is new or else by the user when they are installed. As can be well imagined, however, once operation is started in the system into which the valves are connected, deterioration of the operative elements of the valves often results due to a variety of reasons. This can and quite often does affect their operation, rendering them unreliable.

Accordingly, it becomes necessary to periodically check these valves to insure their proper operation and to prevent the damage and possible injury that would result should one stick in the presence of an excessive over-pressure in the system. In order to test relief valves prior to the present invention, one had to either shut down the system and/or dismantle the valve to be tested. As can be well imagined, such testing techniques bring about considerable expense, downtime and inconvenience, especially in a process or plant utilizing a large number of such valves.

Certain developments have been made toward testing relief valves while they are still in operation. These developments generally, however, are either relatively unreliable, or else they require special types of valves or some rather expensive, delicate or sophisticated equipment, all of which are undesirable.

SUMMARY OF THE PRESENT INVENTION

The present invention is directed to a method and apparatus for the testing of pressure relief valves, or more particularly, to safety devices to be utilized between such relief valves and a pressure system to enable the testing thereof without disconnecting the relief valve from the system, or without shutting down the system. The present invention utilizes a safety device commonly known as a safety head which includes a rupture disc as a part thereof. Many of these rupture discs are so designed that they will withstand a greater pressure exerted from their relief valve side than from their pressure system side. This ability to withstand this greater force may sometimes be achieved by the particular configuration of the disc itself or reinforcing members may be utilized.

By the provision of such a disc having this differential in pressures that it can withstand depending upon the side against which they are exerted, inlet or port means may be provided in the safety device between the disc and the relief valve. By use of this inlet means, the pressure may be increased between the disc and the relief valve to the point at which the valve is to open. Because of its greater ability to withstand pressure exerted on this side of the disc, the disc will not rupture, while at the same time, the relief valve may be tested to determine whether or not it is properly operating.

It is, therefore, an object of the present invention to provide method and apparatus for the testing of relief valves while they are still in operation.

Another object of the present invention is to provide such method and apparatus which utilizes relatively simple and inexpensive equipment. Yet another object of the present invention is to employ presently used equipment for the safety devices with little modification thereto.

Still another object of the present invention is to provide a safety head device having therein a rupture disc; and including means to increase the pressure within the chamber of the safety head, but only on the side of the disc on which the relief valve is located, to the operating pressure level of the relief valve, the pressure increase not exceeding the pressure level that the disc can withstand.

Still another object of the present invention is to provide such apparatus which will provide ease of manufacturing and assembly, as well as operation; and which will be simple in design and construction, thus reducing the maintenance costs while increasing its reliability.

These and other objects, features and advantages of the present invention will be apparent from an examination of the following descriptions of presently preferred embodiments of this invention, which are given for the purpose of disclosure, when taken in conjunction with the accompanying drawings.

BRIEF DESCRIPTION OF THE DRAWINGS

Like character references designate like parts throughout the several views of the drawing, which views are as follows.

BRIEF DESCRIPTION OF THE PREFERRED EMBODIMENT

Figure 1:
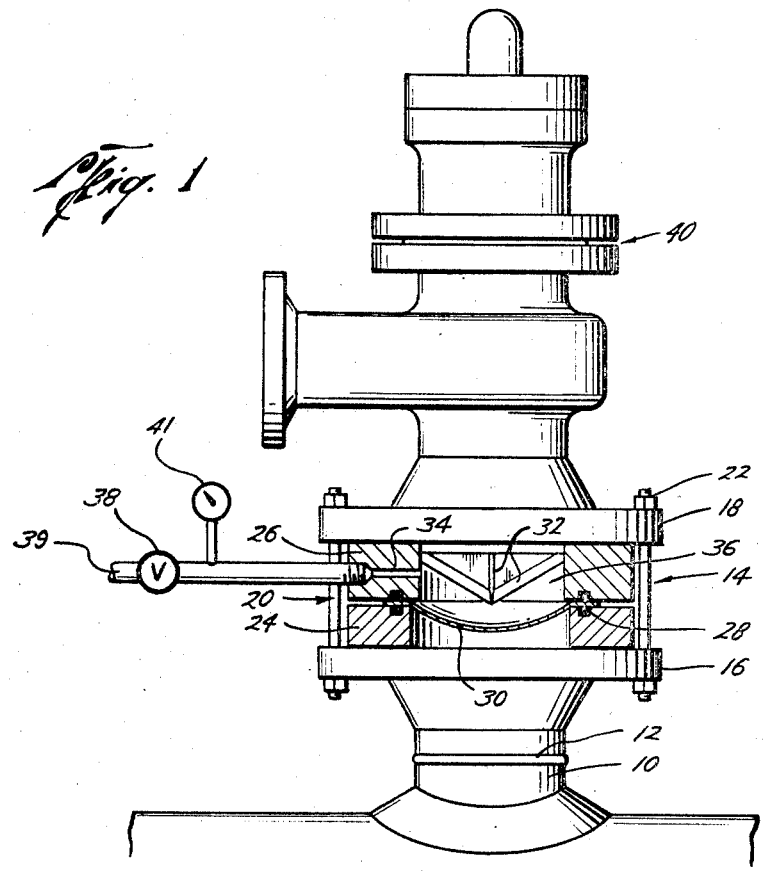
FIGURE 1 is a side view, partially in section, of the present invention as applied to a safety device utilizing a reverse buckling ruptured disc.

Turning now to FIGURE 1, the present invention will be described as utilized in a safety head employing a reverse buckling rupture disc. This invention has utility on a pressure system, such as a vessel or line 10 (hereinafter called "pressure system" or "system"). Connected to the system by the weld 12 is a safety head generally indicated by the numeral 14.

Figure 2:
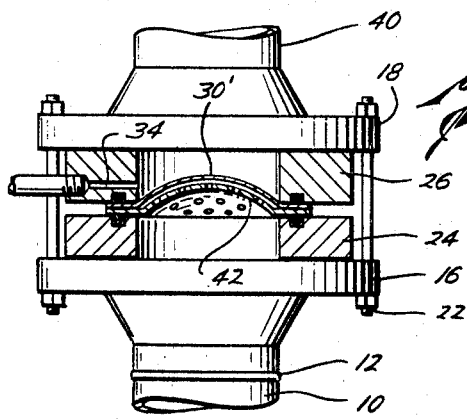
FIGURE 2 is a side view, partially in section, of the present invention as utilized with a rupture disc having a vacuum support.

A typical safety head is shown in section and generally includes two supporting members such as pipe flanges 16 and 18 and a subassembly 20. The pipe flanges 16 and 18 are connected by a series of nuts and bolts such as 22, only one of which is shown in FIGURES 1 and 2.

The subassembly 18 may include a pair of clamping rings 24 and 26 which hold the disc 30 as well as a sealing member 28. In this embodiment, a reverse buckling disc is utilized. Also contained in this particular safety head is a shearing assembly 32 for opening the disc 30 when it buckles under excess pressure.

Also contained in the clamping ring 26 is a port 34 which communicates with the interior chamber 36 of the safety head. A valve 38 controls communication through this port 26, and a threaded rod 39 provides coupling means for connection to an appropriate pressure producing means, such as a compressed air source. A pressure gauge 41 may be installed in the line if it is desired to monitor the applied pressure.

Fixedly connected to the top of the safety head is the relief valve 40. This may be any typical relief valve such as a Farris safety-relief valve manufactured and distributed by Farris Engineering Corp., Palisades Park, N.J. Accordingly, the specific structural details of the relief valve need not be given except to state that it is generally spring operated. The spring is designed to maintain the valve shut until a predetermined pressure is reached. This pressure which will communicate with the interior of the relief valve will override the force exerted by the spring, allowing the valve to open. There are various parts of the relief valve which may function improperly for various reasons, such as extended periods of disuse. The type of malfunction is, however, irrelevant, since the present invention is designed to determine whether or not the valve in its entirety operates properly. Thus, the particular type of malfunction is generally not important for our immediate purposes.

Returning now to the construction of the safety head itself, this particular safety head is more fully disclosed in United States Patent No. 3,294,277, issued on Dec. 27, 1966, to Loren E. Wood. It has been found that such a curved ruptured disc can withstand at least three times greater pressure on its concave side than the amount of pressure required to reverse the disc when applied to its convex side. In operation, therefore, when one desires to check the relief valve 40, it is merely necessary to apply a pressure source to the connection 39 and open the valve 38. This allows pressure to build up in the chamber 36 above the disc 30 without fear of rupturing or damaging it. By proper monitoring of the pressure applied through the port 34, using the gauge 41, the operator can determine when the pressure level or range is reached at which the relief valve should open. If it does not open, opens too soon or too late, the relief valve obviously is not functioning properly, and the necessary steps can be taken to correct this.

By a proper selection of the disc for the particular pressure system and for the pressure at which one desires the relief valve to open, one can insure that an adequate safety factor will be present when applying the overpressure on the relief valve side of the disc. In this manner, relief valves may be tested to insure that they are opening at the proper pressure range without disrupting the operation of the pressure system, rupturing the disc or requiring the dismantling of the relief valve.

Turning now to FIGURE 2, a second application of the present invention will be described. In this embodiment, the pressure system 10, the relief valve 40 and essentially all of the parts of the safety head are the same as in the first embodiment. The differences lie in the particular rupture disc 30'. The rupture disc in this embodiment is again a curved disc, but it has its convex side toward the relief valve. Accordingly, should the overpressure be exerted through the port 34 and against the convex side of the disc, it will collapse, since this side cannot withstand the increase in pressure, as can the concave side.

When such a rupture disc is utilized, however, it is quite common to apply a vacuum support 42 below the rupture disc 30'. In certain pressure systems, there is the likelihood that a vacuum will be created in the system. This would, of course, create a pressure differential about the disc, with the higher pressure being on the convex side. This could result in a buckling and/or rupturing of the disc. To prevent this, a vacuum support, such as plate 42, is used. This vacuum support is a plate having a plurality of holes therein and which is stressed to withstand such a previously described pressure differential created by a vacuum in the system 10. Such a support could also function to prevent the buckling and/or rupturing of the disc 30 when an excess pressure is applied through the port 34 in order to test the relief valve 40, assuming it is made to possess the strength necessary for the particular application in mind.

As is illustrated by this FIGURE 2, the present invention has application wherever support means can be included to reinforce the rupture disc in the safety head to prevent a buckling and rupturing in the direction of the pressure system, or where this can be achieved by the rupture disc itself, such as in the reverse buckling disc of FIGURE 1. The apparatus utilized in the present invention requires little modification from the standard safety head utilized with such pressure systems and relief valves. The apparatus itself is quite simple, requiring no complex equipment in order to test the valve. Furthermore, the pressure system 10 does not have to be shut down, nor does the relief valve have to be taken off the system for testing elsewhere. Due to the extreme simplicity of the device, its reliability is high and its maintenance cost relatively low. This simplicity also provides for decreased cost in manufacturing, as well as ease of use and wide applicability.

The present invention, therefore, is well adapted to carry out the object and attain the ends and advantages mentioned, as well as others inherent therein. While a presently preferred embodiment of the invention has been given for the purpose of disclosure, numerous changes in the detail of construction and the combination, shape, size and arrangement of parts may be resorted to without departing from the spirit and scope of the invention.

What is claimed is:

1. A method of testing a pressure relief valve having a known opening pressure range and mounted on a safety head adapted to receive rupture disc means, including the steps of,
    utilizing in the safety head, rupture disc means that will resist a pressure on its relief valve side greater than said opening pressure range, and
    increasing the pressure in the safety head on the relief valve side of the disc means to the opening pressure range of the relief valve.

2. The invention of claim 1 wherein said utilizing step is further defined us,
    utilizing in the safety head a curved rupture disc which can withstand a known maximum pressure exerted on its concave side which is above the opening pressure range, and
    positioning said rupture disc in the safety head with its concave side facing the relief valve, said invention further including the step of,
    maintaining the pressure increase in the safety head below said known maximum pressure.

3. The invention of claim 1 wherein said utilizing step is further defined as,
    utilizing in the safety head a curved rupture disc,
    positioning the disc with its convex side facing the relief valve,
    utilizing support means on its concave side capable of supporting the disc against a known amount of pressure exerted on its convex side, which known amount of pressure is above the opening pressure range, said invention further including the step of,
    maintaining the pressure increase in the safety head below said known maximum pressure.

References Cited

UNITED STATES PATENTS

| | | | |
|---|---|---|---|
| 2,178,901 | 11/1939 | Webster | 73—4 |
| 2,225,220 | 12/1940 | Huff | 220—89 |
| 2,788,794 | 4/1957 | Holinger | 137—71 |
| 3,109,554 | 11/1963 | Porter et al. | 220—89 |

LOUIS R. PRINCE, Primary Examiner

H. C. POST, Assistant Examiner

U.S. Cl. X.R.

37—69; 137—71